| United States Patent [19] | [11] Patent Number: 5,057,335 |
| --- | --- |
| Hanagata et al. | [45] Date of Patent: Oct. 15, 1991 |

[54] METHOD FOR FORMING A CERAMIC COATING BY LASER BEAM IRRADIATION

[75] Inventors: Haruo Hanagata, Ebina; Kathuhide Oshima; Hidesato Igarashi, both of Tokyo; Noboru Morita, Chiba, all of Japan

[73] Assignee: Dipsol Chemical Co., Ltd., Tokyo, Japan

[21] Appl. No.: 415,859

[22] Filed: Oct. 2, 1989

[30] Foreign Application Priority Data

Oct. 12, 1988 [JP] Japan ................................. 1-256458
Mar. 7, 1989 [JP] Japan ................................. 1-54074
Mar. 27, 1989 [JP] Japan ................................. 1-74647

[51] Int. Cl.$^5$ ........................ B05D 3/06; B05D 5/12; B05D 3/02; C01B 00/00
[52] U.S. Cl. ................ 427/53.1; 427/126.2; 427/126.3; 427/126.4; 427/226; 204/157.41; 204/157.45; 204/157.51
[58] Field of Search ................. 427/53.1, 126.2, 126.3, 427/126.4, 226; 204/157.4, 157.41, 157.45, 157.51

[56] References Cited

U.S. PATENT DOCUMENTS

| 4,224,072 | 9/1980 | Stewart | 204/157.41 |
| --- | --- | --- | --- |
| 4,256,545 | 3/1981 | Deborski | 427/226 |
| 4,340,617 | 7/1982 | Deutsch et al. | 427/53.1 |
| 4,349,583 | 9/1982 | Kulynych et al. | 427/53.1 |
| 4,514,456 | 4/1985 | Deal et al. | 427/53.1 |
| 4,615,913 | 10/1986 | Jones et al. | 427/226 |
| 4,658,761 | 4/1987 | Duggan | 1/1 |

FOREIGN PATENT DOCUMENTS 0300845 1/1989 European Pat. Off.

*Primary Examiner*—Shrive Beck
*Assistant Examiner*—Marianne L. Padgett
*Attorney, Agent, or Firm*—Oblon, Spivak, McClelland, Maier & Neustadt

[57] ABSTRACT

A method for forming a ceramic coating on a substrate comprises immersing the substrate such as stainless steel in an aqueous solution containing a silicic acid compound such as sodium silicate and/or a metal salt of oxygen acid such as an aluminate, and irradiating the substrate with a laser beam. By this method, a dense and fine ceramic coating can be uniformly formed on the substrate without using an apparatus of large scale required in the gas phase method and without heating the system to a high temperature.

13 Claims, No Drawings

METHOD FOR FORMING A CERAMIC COATING BY LASER BEAM IRRADIATION

BACKGROUND OF THE INVENTION

The present invention relates to a method for forming a ceramic coating on a part by irradiating it with a laser beam.

Ceramic coatings have been conventionally formed on a substrate by use of a gas phase method, a solid phase method or a liquid phase method. The gas phase method comprises once vaporizing or ionizing materials capable of forming ceramic coating, and then depositing the materials on the substrate to form the ceramic coating. According to the gas phase method, there can be prepared any coating of various compounds and the thus prepared coating is very pure and of good properties. It also has such advantages as good adhesion to the substrate. However, since it is necessary to maintain the reaction temperature over 1000° C. in the gas phase method, this method is usable only for substrates having a high temperature resistance. This method also has a disadvantage in that it requires an apparatus of large scale because this method should be carried out under a vacuum. The solid phase method comprises adhering certain materials to the substrate and then reacting the materials with the substrate to form a coating. Since the reaction of the materials with the substrate is used for forming the coating, the method has disadvantages in that the reaction temperature should be maintained high and the kind of ceramic coating is limited to specific ones.

On the other hand, although various liquid phase methods have been tried, the spray method is the most popular one. This method comprises preparing a metal alkoxide or an organic metal compound in a liquid state, coating it onto the substrate and heat-decomposing the compounds to form a coating on the substrate. By this method, the formation of the coating is relatively easy, but there are many disadvantages such as that the thus formed coating is not dense, it is difficult to control the thickness of the coating, adhesion between the substrate and the coating is not sufficient, and it is necessary to heat-treat each substrate. Examples of methods other than the spray method for forming a ceramic coating on a metal substrate include an anodizing process. According to this anodizing process, a dense ceramic coating is formed, but this method has a disadvantage in that the formed ceramic is limited to $Al_2O_3$. Furthermore, an anode spark discharge method is known as a method utilizing electrolysis. For example, Japanese patent publication (hereinafter referred to as J.P. KOKOKU) Nos. 58-17278, 59-28386, 59-28638 and 59-45722 disclose methods for forming a ceramic coating on a substrate, which comprise conducting an electrolysis in an aqueous alkali solution of silicate or various metal salts of oxygen acid and generating spark discharge between anode metal, silicic acid ions and metal oxygen acid ions present near the anode. Although various ceramic coatings can be formed on a substrate by these methods, there are disadvantages in that the thus formed coatings are porous and the substrates to be used are limited to metal, in particular, Al, Mg, Ti and the like.

Therefore, according to the conventional methods, except for some liquid phase methods, heating at a high temperature is required, so that a ceramic coating can be formed only on certain substrates which have superior heat resistance. In addition, according to the conventional method, it is very difficult to partially form the ceramic coating on the substrate.

SUMMARY OF THE INVENTION

It is therefore a primary object of the present invention to provide a method for uniformly forming a dense and fine ceramic coating on a substrate without using an apparatus of large scale as used in a gas phase method and without heating the system to a high temperature.

Other objects of the invention will be clear from the following description.

The present invention has been accomplished based on the finding that a dense and fine ceramic coating is uniformly formed on a substrate by immersing the substrate in a specific solution, and dircting laser beam onto the substrate to form a ceramic coating on the irradiated part of the substrate.

In accordance with the present invention, there is provided a method for forming a ceramic coating on a substrate, which comprises immersing the substrate in an aqueous solution containing a silicic acid compound and/or a metal salt of oxygen acid, and irradiating the substrate with a laser beam.

DESCRIPTION OF THE PREFERRED EMBODIMENTS

Examples of silicic acid compounds usable in the invention include various water soluble or water dispersable compounds represented by the formula: $M_2O \cdot nSiO_2$ wherein M is alkali metal and n is 0.5 to 100. Specifically, sodium silicate, sodium metasilicate, potassium silicate, lithium silicate, colloidal silica or the like is used singly or in combination. Examples of metal salts of oxygen acid include tungstates, stannates, molybdates, phosphates, vanadates, borates, chromates, aluminates, permanganates and the like. These compounds are used singly or in combination. Furthermore, these metal salts of oxygen acid can be used by mixing with the silicic acid compound in an appropriate ratio. Although there can be used an aqueous solution containing the compound set out above in a desired amount in this invention, there is usually used an aqueous solution containing the compound in an amount of 0.1 to 90 weight % (hereinafter referred to as %), preferably 3 to 25%. It is possible to use the aqueous solution of a desired pH, but it is preferable to use the aqueous solution having a pH of 4 to 14, more preferably 10 to 14. Furthermore, Ca, Ba, Mg, Ge, Zr, Fe, Ni, Cr, Pb or the like can be added to the aqueous solution in the form of water soluble salt in an amount of 0.1 to 20%.

According to this invention, a substrate made from various metals and ceramics, for example, stainless steel, copper, iron, aluminum, silicon nitride, aluminum nitride and the like is immersed in the aqueous solution and a laser beam is directed onto the desired part of the substrate to form a ceramic coating on the irradiated part of the substrate such that the coating is made from components dissolved in the solution.

Although any kind of laser beam can be employed in this invention, it is preferable to employ a continuous oscillation laser beam or a pulsed laser beam having a pulse width of not shorter than 0.5 ms, preferably 0.5 to 1.2 ms, most preferably 0.7 to 1.0 ms. A dense ceramic coating can be formed by use of any laser beams other than the laser beam mentioned above, but a more preferable dense ceramic coating can be formed uniformly by use of the specific laser beam set out above. In this connection, plural laser beams can be used.

In this invention, the laser beam can be directed onto the substrate at a relatively low temperature of, for example, 2° to 100° C. Therefore, the substrate is not damaged even though the temperature of the substrate is increased by the laser beam. Since a laser beam is used in this invention, the area on which the coating is formed is determined by the spot size of the laser beam. Therefore, the ceramic coating can be formed in a thickness of, for example, 0.1 to 50 μm on a desired area in the spot size within the limitation of the wavelength of the laser beam. However, the maximum thickness of the coating is not limited to the thickness mentioned above.

Since this invention employs the continuous energy of a laser beam, it is easy to control the thickness of the film thus formed and it is possible to form a continuous ceramic films in various forms such as lines, circles, squares and to a desired thickness at a part close to a part at which a film has just been formed, by moving the substrate or the laser beam. It is also possible to form a ceramic coating on the whole surface of the substrate.

Furthermore, since formation of the ceramic coating progresses in a limited area and the continuous energy of the laser beam is employed, a dense coating can be obtained.

Therefore, according to this invention, it is possible to partially form a dense coating on a specific area of mechanical parts which require local wear resistance.

In addition, the method of this invention can be carried out at a low temperature, so that a ceramic coating can be formed on a metal substrate having a low melting point such as an aluminum substrate, and another ceramic film can be formed on a ceramic substrate having no conductivity. Therefore, this invention can be widely applied in various fields.

This invention will be explained hereinafter with respect to non-limitative examples.

EXAMPLE 1

An aqueous solution containing $K_2O \cdot SiO_2$ in amount of 200 g/l was prepared and an aluminum substrate was immersed therein. A laser beam was directed perpendicularlly onto the substrate through an optical glass.

A ceramic coating was continuously formed on the irradiated part of the substrate from the begining of the irradiation, and the coating formation speed was 1 μm/sec in the case where the laser beam was directed onto the substrate in a spot.

A linear coating having a thickness of 0.5 μm was formed by moving the laser beam at a speed of 1 mm/sec perpendicular to the substrate.

The laser beam used in this example was a YAG laser beam of continuous output power having a wavelength of 1.06 μm and a spot diameter of 0.5 mm, and the output power of the laser was 20 W.

EXAMPLE 2

Laser beam irradiation was carried out by the same method as in Example 1 except that a stainless steel, copper, silicone nitride substrate or a ceramic substrate prepared by the anode spark discharge method was used instead of the aluminum substrate and therefore, there was formed on the substrate the same coating as that of Example 1.

EXAMPLE 3

This example was carried out by the same method as in Example 1 except that an aqueous solution containing $NaAlO_2$ and $NaOH$ in amount of 100 g/l and 10 g/l, respectively, was used instead of the solution containing $K_2O \cdot SiO_2$ and the laser beam was directed onto the substraste at a coating-formation speed of 0.1 μm/sec, whereby, a ceramic coating was formed on the substrate in a manner similar to Example 1.

EXAMPLE 4

An aqueous solution containing $Na_2O \cdot SiO_2$ in an amount of 50 g/l was prepared and the laser beam was directed onto a copper substrate in a manner similar to that of Example 1 under the following conditions, using the thus prepared solution:

| | |
|---|---|
| Average laser power output | 1 W |
| Pulse width | 0.6 mS |
| Pulse frequency | 15 Hz |
| Laser beam used | YAG laser (1.06 μm) |
| Temperature of the solution | 30° C. |

The irradiation condition

As a result, a ceramic coating was formed at the speed of 0.5 μm/sec and EPMA (Electron Probe X-ray Microanalyzer) analysis revealed that Na, Si and O were present in the coating.

EXAMPLE 5

An aqueous solution containing colloidal silica in an amount of 70 g/l was prepared and the laser beam was directed onto the substrate under conditions similar to those of Example 4, whereby a ceramic coating was formed at the speed of 0.2 μm/sec and EPMA analysis revealed that Si and O were present in the coating.

EXAMPLE 6

An aqueous solution containing $Na_2O \cdot SiO_2 \cdot 5H_2O$ and PbO in amounts of 50 g/l and 2 g/l, respectively, was prepared and the laser beam was directed onto a stainless steel substrate under conditions similar to those of Example 4, whereby a ceramic coating was formed at the speed of 0.2 μm/sec and EPMA analysis revealed that Na, Si, Pb and O were present in the coating.

EXAMPLE 7

An aqueous solution containing $Na_2O \cdot SiO_2 \cdot 5H_2O$, PbO, $NaAlO_3$ and NaOH in amounts of 30 g/l, 1 g/l, 2 g/l and 1 g/l, respectively, was prepared and the laser beam was directed onto an iron substrate under conditions similar to those of Example 4, whereby a ceramic coating was formed at the speed of 0.5 μm/sec and EPMA analysis revealed that Na, Si, Pb, Al and O were present in the coating.

EXAMPLE 8

An aqueous solution containing colloidal silica and acetic acid in amounts of 100 g/l and 30 g/l, respectively, was prepared and a laser beam was directed onto a stainless steel substrate under conditions similar to those of Example 4, whereby a ceramic coating was formed at the speed of 0.2 μm/sec and EPMA analysis revealed that Si and O were present in the coating.

EXAMPLE 9

This example was carried out by the same method as Example 4 except that the temperature of the solution was changed to 50° C. or 15° C. from 30° C., and therefore, the ceramic coating speed and the content of the coating were the same as those of Example 4.

EXAMPLE 10

An aqueous solution containing $K_2O \cdot SiO_2$ in amount of 50 g/l was prepared and a clean stainless steel (SUS 304) substrate was immersed therein. A laser beam was directed perpendicularlly onto the substrate through an optical glass. In this connection, a pulsed Nd:YGA laser beam was used as the laser beam and the output power of the laser was controlled to a constant level and the pulse width was changed to 0.12 ms, 0.58 ms, 0.76 ms or 1.0 ms.

A ceramic coating was continuously formed on the irradiated part of the substrate from the beginning of the irradiation, and the coating formation speed was 0.5 to 2 μm/sec in the case where the laser was directed onto the substrate as a spot.

The conditions of the laser beam irradiation were as follows:

| Laser beam used | Pulse excited Nd: YAG laser (1.06 μm) |
|---|---|
| Average laser output power | 0.8 W |
| Pulse width | 0.12 ms, 0.58 ms, 0.76 ms or 1.0 ms |
| Time period of the laser irradiation | 60 sec |
| Temperature of the solution | 20° C. |

As a result of the change in conditions mentioned above, it was found that the longer the pulse width of the laser beam was, the more regular was the deposition of fine ceramic obtained. In particular, good ceramic coatings were obtained in the cases of a pulse width of 0.58 to 1.0 ms. EPMA analysis revealed that Si, K and O were present in the coating.

EXAMPLE 11

Laser beam irradiation was carried out by the same method as in Example 10 except that an aluminum, copper, silicone nitride substrate or a ceramic substrate prepared by the anode spark discharge method was used instead of the stainless steel, whereby there was formed on the substrate the same coating as that of Example 10.

EXAMPLE 12

This example was carried out by the same method as Example 10 except that a laser beam obtained from a continuous powered laser was used instead of the pulsed laser beam and the irradiation was carried out under the following conditions:

The radiation condition

| Laser beam used | Continuous oscillation YAG laser (1.06 μm) |
|---|---|
| Average laser output power | 20 W |
| Time period of laser radiation | 60 sec |
| Temperature of the solution | 20° C. |

As a result, there was obtained a good ceramic coating of the same kind as that obtained in the case of a pulse width of 0.76 ms in Example 10.

EXAMPLE 13

An aqueous solution containing $Na_2O \cdot SiO_2$ in an amount of 50 g/l was prepared and the laser beam was directed onto the substrate in a manner similar to that in Example 12. As a result, there was obtained a good ceramic coating of the same kind as that of Example 12 and EPMA analysis revealed that Si, Na and O were present in the coating.

EXAMPLE 14

An aqueous solution containing colloidal silica in an amount of 100 g/l was prepared and the laser beam was directed onto the substrate in a manner similar to that in Example 12. As a result, there was obtained a good ceramic coating of the same kind as that in Example 12 and EPMA analysis revealed that Si and O were present in the coating.

EXAMPLE 15

An aqueous solution containing colloidal silica in an amount of 100 g/l was prepared and the laser beam was directed onto the substrate in a manner similar to that in Example 10. As a result, there was obtained a good ceramic coating of the same kind as that in Example 10 at a pulse width of 0.58 to 1.0 ms.

What is claimed is:

1. A method for forming a ceramic coating on a substrate, which comprises immersing the substrate in an aqueous solution containing a soluble silicic acid compound, or a soluble metal salt of an oxyacid, or mixtures thereof and irradiating the substrate in the aqueous solution with a laser beam.

2. A method as set forth in claim 1 wherein the laser beam is a pulsed laser beam having a pulse width of 0.5 to 1.2 ms.

3. A method as set forth in claim 1 wherein the laser beam is a pulsed laser beam having a pulse width of 0.7 to 1.0 ms.

4. A method as set forth in claim 1 wherein the laser beam is a continuous oscillation laser beam.

5. A method as set forth in claim 1 wherein the aqueous solution contains a silicic acid compound and/or a metal salt of oxyacid in an amount of 0.1 to 90 weight %.

6. A method as set forth in claim 1 wherein the silicic acid compound is selected from the group consisting of water soluble or water dispersable compounds represented by the formula: $M_2O \cdot nSiO_2$ wherein M is alkali metal and n is 0.5 to 100.

7. A method as set forth in claim 1 wherein the silicic acid compound is selected from the group consisting of sodium silicate, sodium metasilicate, potassium silicate, and lithium silicate.

8. A method as set forth in claim 1 wherein the metal salt of oxyacid is selected from the group consisting of tungstates, stannates, molybdates, phosphates, vanadates, borates, chromates, aluminates and permanganates.

9. A method as set forth in claim 1 wherein pH of the aqueous solution is 4 to 14.

10. A method as set forth in claim 1 wherein the substrate is a metal substrate or a ceramic substrate.

11. A method as set forth in claim 1 wherein the substrate is selected from the group consisting of stainless steel, copper, iron, aluminum, silicon nitride and aluminum nitride substrate.

12. A method as set forth in claim 1 wherein the ceramic coating is formed in a thickness of 0.1 to 50 μm.

13. A method as set forth in claim 1 wherein the silicic acid compound is colloidal silica.

* * * * *